United States Patent [19]

Wizgall et al.

[11] Patent Number: 5,630,209

[45] Date of Patent: May 13, 1997

[54] EMERGENCY CALL SYSTEM

[75] Inventors: Manfred Wizgall; Axel Kuttner, both of Stuttgart; Horst Ohnsorge, Freiberg, all of Germany

[73] Assignee: Alcatel Sel Aktiengesellschaft, Stuttgart, Germany

[21] Appl. No.: 253,741

[22] Filed: Jun. 3, 1994

[30] Foreign Application Priority Data

Jun. 3, 1993 [DE] Germany .......................... 43 18 441.3

[51] Int. Cl.⁶ .......................................... H04B 1/00
[52] U.S. Cl. .................... 455/66; 455/70; 455/100; 379/45; 340/539
[58] Field of Search .................... 455/66, 70, 88, 455/100, 227; 340/539; 235/375, 380; 379/37, 45, 357, 91, 144, 49, 51

[56] References Cited

U.S. PATENT DOCUMENTS

| | | | |
|---|---|---|---|
| 4,736,196 | 4/1988 | McMahon et al. | 340/539 |
| 4,798,322 | 1/1989 | Bernstein et al. | 235/380 |
| 4,958,645 | 9/1990 | Cadell et al. | 128/903 |
| 4,961,217 | 10/1990 | Akiyama | 379/89 |
| 4,998,095 | 3/1991 | Shields | 455/88 |
| 5,291,399 | 3/1994 | Chaco | 235/375 |
| 5,388,147 | 2/1995 | Grimes | 379/45 |
| 5,479,496 | 12/1995 | Endo et al. | 379/357 |

FOREIGN PATENT DOCUMENTS

| | | |
|---|---|---|
| 0015313 | 9/1980 | European Pat. Off. . |
| 0350554 | 1/1990 | European Pat. Off. . |
| 0503151 | 9/1992 | European Pat. Off. . |
| 2362071 | 6/1975 | Germany . |
| 2715541 | 10/1978 | Germany . |
| 3410619 | 10/1985 | Germany . |
| 3527330 | 2/1987 | Germany . |
| 3830301 | 3/1990 | Germany . |
| 3839959 | 4/1990 | Germany . |
| 4030993 | 4/1991 | Germany . |
| 4032198 | 4/1992 | Germany . |
| 4118994 | 12/1992 | Germany . |
| 4121589 | 1/1993 | Germany . |
| 4212200 | 2/1993 | Germany . |
| 4130647 | 3/1993 | Germany . |
| 4141382 | 6/1993 | Germany . |
| 4201197 | 7/1993 | Germany . |
| 4118993 | 12/1993 | Germany . |
| 260275 | 2/1990 | Japan . |
| 2226951 | 9/1990 | Japan . |

OTHER PUBLICATIONS

Murry, William N., *Emergency Medical Alert Watch*, May 1992, Motorola Inc., Technical Developments, vol. 15, pp. 14 and 15.

Wolfenstetter, Klaus–Dieter, *Multimedium Chipkarte: Informationsträger, Sicherheitswerkzeug, Wertkarte*, telekom praxis Mar. 1993, pp. 33 to 39.

Hashagen, Jan, *Hausontruf bringt Selbständigkeit*, Funkschau Dec. 1990, pp. 56 to 59.

Arndt, Gerhard and Lueder, Reinhard, *Bewengungsfreiheit in allen Netzen*, telecom report 16, 1993 Heft 2, pp. 67 to 69.

Chaberny, Walter, *Bündelfunk bei der Bundesbahn*, Funkschau 15/91 I Spezial, pp. 24 to 26.

Koch, E., *Neues Mobilfunksystem für Verkehrs–Notfälle*, Funk–Technik, Nr. 14/1976, pp. 437 to 440.

(List continued on next page.)

*Primary Examiner*—Chi H. Pham
*Attorney, Agent, or Firm*—Spencer & Frank

[57] ABSTRACT

An emergency call system includes a wireless telecommunication network having predetermined radio channels, at least one wireless emergency call transmission device for reading emergency data and transmitting the data in an emergency call message on at least one of the radio channels, and at least one emergency call receiver device. The at least one emergency call receiver device receives and evaluates the emergency call message, and triggers at least one alarm function and/or further conducts the emergency data to an alarm center connected to the wireless telecommunication network. The system may also be embodied in a wire-bound network.

18 Claims, 4 Drawing Sheets

OTHER PUBLICATIONS

J. Kedaj and G. Hentschel *Mobilfunk* ("Mobile Radio"), 1st Ed., Chapters 4–6, Neue Mediengesellschaft Publishing Co., Ulm, 1991.

H.P. Kistner, "Funkschau," 6th Ed., 1993, Franzis Publishing Co., Munich.

Dr. T. Wille, "Rechengenie in der Plastikkarte," (Computing Genius in the Plastic Card), in Funkschau, 7th Ed., 1993, Franzis Publishing Co., Munich.

P. Schöffel et al., "Architektur eines Mobilfunkgerätes für das Netz D" (Architecture of a Mobile Radio device for Network D), in Philips Innovation, Jan. 1991.

A. Simianer, "Autonotfunk, ein Funknotmeldesystem für Verkehrsteilnehmer" (Emergency Automobile Radio, Radio Emergency Report System for Drivers) NTG Technical Reports, Bewegliche Funkdienste (Mobile Radio Services) vol. 61, pp. 148–152, VDE Publishing Co., Berlin, 1977.

H. Armbruster, "Dritte Generation der Mobilkommunikation" (The Third Generation of Mobile Communication), Telecom Report 15, part 2, Siemens AG, Munich, 1992.

A. Kailling, "Notruftelefon" (Emergency Call Telephone), Instructional Pamphlets of German Federal Post Office, pp. 3–14, 1st Ed., 35/1982.

ISO (Int. Standard Org.) document #7816–2; 1988(E), Technical Committee ISO/TC 97, Information Processing Systems, May 15, 1988, 1st Ed.

ISO (Intl. Standards Org.) document #7816–3; 1989(E), Technical Committee ISO/IEC JTCI, Information Technology Sep. 15, 1989, 1st Ed.

ISO (Intl. Standards Org.) document #7816–3:1989/Amd.1: 1992 (E), Technical Committee ISO/IEC JTC1, Information Technology, Dec. 1, 1992.

EMERGENCY CALL SYSTEM

CROSS REFERENCE TO RELATED APPLICATION

This application claims the priority of German Application No. P 43 18 441.3 filed Jun. 3, 1993, which is incorporated herein by reference.

BACKGROUND OF THE INVENTION

1. Field of the Invention

The invention relates to the field of emergency call systems.

2. Background Information

Emergency call systems are known in which emergency calls can be placed by means of wireless or wire-bound emergency call transmission devices.

An emergency call system is known from DE 4,130, 647.A1 in which an emergency call signal is transmitted from a portable radio transmitter to a base unit of a cordless telephone. The emergency call signal contains an emergency call code which is decoded in the receiver of the base unit. This emergency call code indicates a telephone number that is stored in the base unit. A telephone-dialing device inside the base unit controls a dialing procedure for a telephone connection with an individual who can be reached at this telephone number. This individual is only informed (e.g., by way of an automated voice message) that an emergency situation is occurring.

A public telephone network is known from DE 3,410, 619.A1 in which text messages are stored, so that speech-impaired individuals, for one, can request help in an emergency. For this purpose, every public telephone station is equipped with a text card-reading device, which reads address and text data from a portable text card inserted into the text card-reading device in an emergency. The public telephone station utilizes automatic dialing devices that dial a specific receiving station according to the address data, and transmit the text data to this station.

A wire-bound emergency call system equipped with ISDN terminals and chip card readers is known from "Patent Abstracts of Japan, JP 2-22 69 51 A, E-1006, Nov. 27, 1990, Vol. 14, No. 537." A connection is made to an emergency call center (e.g., police, fire department, hospital) upon insertion of chip card on which emergency call information is stored. Afterward, the emergency call information and the identification of the ISDN terminal (user-user information) are connected to one another in an editor and transmitted to the emergency call center.

A further emergency call system is described in, for example, the article "Notruftelefon" (in English: "Emergency Call Telephone"), by A. Kailling, Instructional Pamphlets of the German Federal Post Office, pp. 3–14, 1st Ed., 35/1982. In this article the so-called emergency call system 73 is described, in which emergency calls are transmitted by way of the public telephone network of the German Federal Post Office. This emergency call system is designed for personal protection and protection of property within a limited area of protection, and only permits local placement of an emergency call. The emergency call system is set up within the local networks so that the police or fire department can be called upon in an emergency. It is also realized as an emergency call box system for highways. The emergency calls are transmitted to a so-called emergency assistance request station that initiates and coordinates rescue action. The emergency call itself, i.e., the trigger of an alarm, can be followed by the transmission by telephone of a report of an emergency so that concerted rescue action can be initiated.

Further emergency call systems are known in which emergency calls can be placed via radio, i.e., locally. An emergency call system of this type is described, for example, in the article "Autonotfunk, ein Funknotmeldesystem für Verkehrsteilnehmer" (in English: "Emergency Automobile Radio, a Radio Emergency Report System for Drivers") by A. Simianer, NTG Technical Reports, "Bewegliche Funkdienste" (in English: "Mobile Radio Services"), Vol. 61, pp. 148–152, VDE Publishing Co., Berlin, 1977. This so-called "emergency automobile radio system" comprises wireless emergency call transmission devices that are installed into motor vehicles. It is possible to transmit an emergency call message that includes "the vehicle identification (number on the vehicle registration) and the nature of the crisis (emergency, accident);" it is also possible to hold a "controlled, two-way conversation" with the emergency call center (rescue relay center). The motor vehicle can be located by means of radio direction finding.

Furthermore, radio systems are known in which the radio devices and radio stations are technologically equipped for emergency call service. Examples of such radio systems are the "GSM" (Global System for Mobile Communications) cellular mobile radio system and the "Chekker" bundled radio system, as described in the book *Mobilfunk* (in English: "Mobile Radio"), by J. Kedaj and G. Hentschel, 1st Ed., Chapters 4–6, Neue Mediengesellschaft Publishing Co., Ulm, 1991. In these two radio systems, the subscriber's respective radio device also serves as an emergency call radio device. This device triggers an alarm by way of the organization channel, and forces a subsequent allocation of a voice channel, by way of which a report of an emergency can be made to the alarm center.

The known emergency call systems are tailored for a specific area of protection (highways, buildings, radio range, etc.) and specific circles of people (automobile drivers, mobile radio subscribers, etc.).

With the known emergency call systems, information about the persons affected by the emergency must be imparted orally to the alarm center. This is not possible in every emergency situation, particularly when no assistants are in the area and the affected person is seriously injured. Also, people who have problems speaking (e.g., foreigners or the speech-impaired) cannot fully utilize these conventional emergency call systems.

SUMMARY OF THE INVENTION

It is an object of the invention to design an emergency call system that permits everyone to transmit an emergency call with a report of an emergency and request specific assistance simply and quickly.

The object is attained by an emergency call system including a wireless telecommunication network having predetermined radio channels, at least one wireless emergency call transmission means for reading emergency data and transmitting the data in an emergency call message on at least one of the radio channels, and at least one emergency call receiver means for receiving and evaluating the emergency call message, and for at least one of triggering at least one alarm function, and/or further conducting the emergency data to an alarm center connected to the wireless telecommunication network.

In another embodiment, an emergency call system includes a wire-bound transmission network having at least one available message channel, at least one wire-bound emergency call transmission means for reading emergency data and an identification number of the emergency data and transmitting the data and identification number together in an emergency call message on the message channel, and at least one emergency call receiver means for receiving and evaluating the emergency call message, and at least one of triggering at least one alarm function, and/or further conducting the emergency data to an alarm center connected to the wireless telecommunication network.

Furthermore, devices for such an emergency call system are disclosed. In one embodiment, the at least one wireless emergency call transmission means comprises a card reader for reading the emergency data from a memory card, a signal-processing element disposed downstream of the card reader, for preparing an emergency call message using the emergency data, and an HF transmission element disposed downstream of the signal-processing element for transmitting the emergency call message on a predetermined channel.

In another embodiment, the at least one emergency call transmission means comprises a wireless device having a portable housing which includes a carrying frame and an antenna integrated therein.

In further embodiments, the emergency call transmission means comprises switching means connected to the signal-processing element, for linking the emergency call message with an identification corresponding to a given alarm category and for determining the alarm functions to be triggered. The memory card may be configured so that it assumes at least two different inserted positions in the card reader, the at least two different inserted positions each determining an alarm category, wherein the respective inserted position causes at least one of the switching means to be switched.

Further advantageous modifications of the invention are described in the detailed description and defined in the claims.

Accordingly, it is particularly advantageous to set up the emergency call system in existing wire-bound transmission networks, for example the telephone network or the streetlight network. The utilization of this diversified infrastructure permits the emergency call system to be constructed and expanded cost-effectively.

Moreover, it is particularly advantageous to configure the emergency call system such that it uses existing service radio networks or mobile radio networks. With the wireless emergency call transmission device, which transmits an emergency call message on a corresponding service or mobile radio channel, assistance can be requested at any time within the entire radio range.

It is also particularly advantageous to equip the emergency call transmission device with the type of card reader that can read a so-called patient chip card. Important medical patient data can thus be read and integrated into the emergency call message.

BRIEF DESCRIPTION OF THE DRAWINGS

The above and other features and advantageous embodiments of the invention will become apparent from the following detailed description taken with the drawings in which.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not be construed as limiting the inventive concept to any particular physical configuration.

Figure 1:
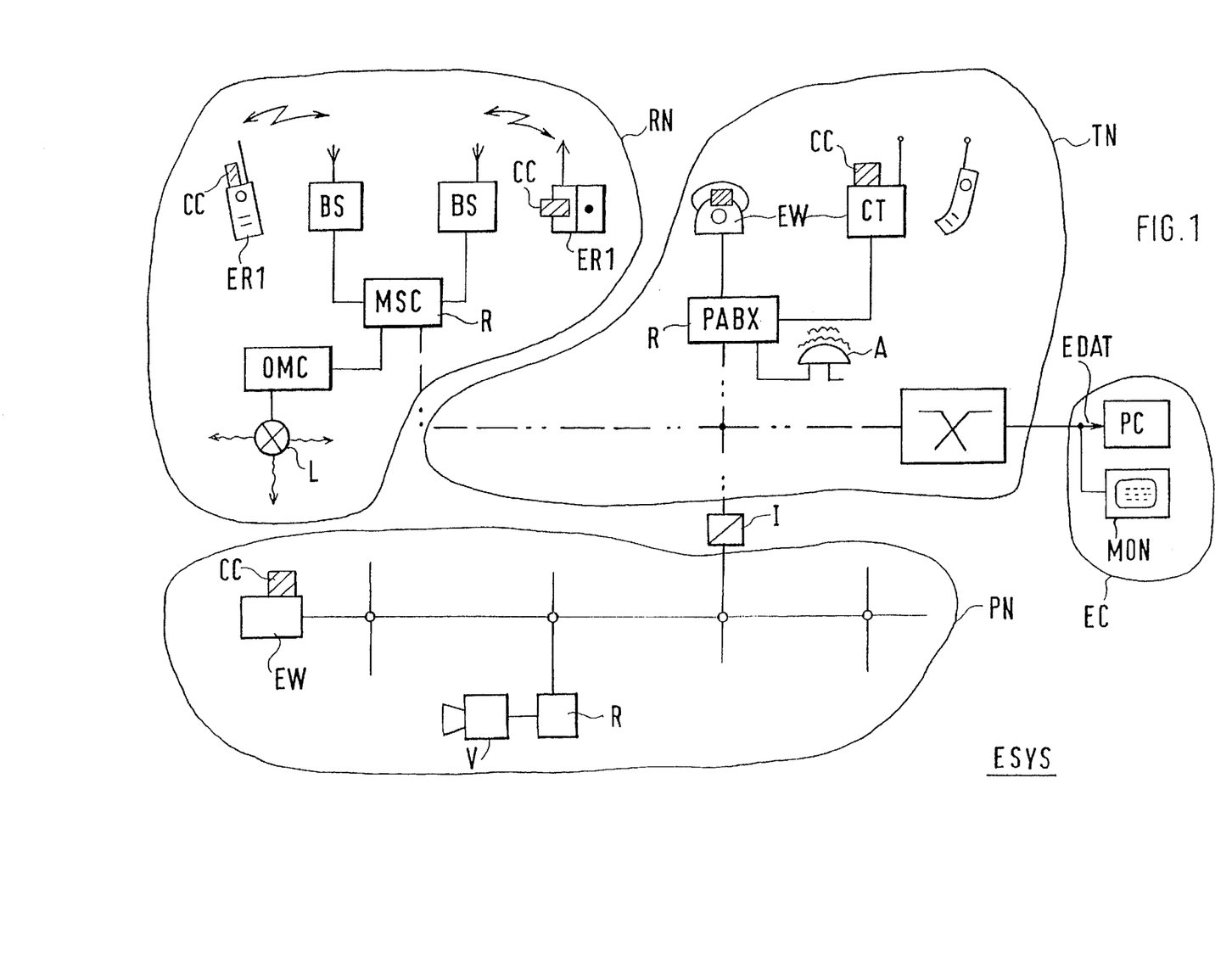
FIG. 1 schematically shows the configuration of an emergency call system in which emergency calls can be placed by way of a mobile radio network, a telephone network and a streetlight network.

The exemplary emergency call system ESYS shown in FIG. 1 encompasses a transmission network comprising a mobile radio network RN, a telephone network TN connected therewith, and an energy supply network PN connected therewith by way of an NF transmitter I. An alarm center EC, which comprises a computer PC and a monitor MON, is connected to telephone network TN. Emergency call system ESYS encompasses wirebound emergency call transmission devices EW, which are connected to telephone network TN or energy supply network PN. Furthermore, the emergency call system includes wireless emergency call transmission devices ER1, which are connected to mobile radio network RN. Emergency call transmission devices EW and ER1 each include a card reader that reads, from a memory card CC, emergency data EDAT to be transmitted.

Emergency call system ESYS includes three emergency call receiver devices R that trigger an alarm function, for example a light signal L, an acoustic signal A or video monitoring system V in the event that an emergency call message EMES is received that includes a corresponding identification. One of the emergency call receiving devices R is realized in a radio switching center MSC of mobile radio network RN, another in a private branch exchange PABX of telephone network TN. These emergency call receiving devices R further conduct emergency data EDAT of emergency call message EMES to alarm center EC in case the identification indicates, for example, a request for medical assistance.

The mode of operation of emergency call transmitting devices EW and ER1 and that of emergency call receiving devices R is described in more detail later.

First, the three above-named networks TN, PN and RN that constitute the transmission network of emergency call system ESYS are described.

Mobile radio network RN, for example, is designed according to the GSM standard. It includes a plurality of stationary radio base stations BS, a radio switching center MSC connected therewith and a service and assessment location OMC connected therewith.

A person within the radio link hop range of one of stationary radio base stations BS can place a wireless emergency call at any time by means of the wireless emergency call transmission device ER1, hereinafter referred to as an emergency call radio device. The emergency call radio device can be configured as, for example, a compact data radio device. It is likewise possible to integrate the radio device into a mobile radio device (mobile station, hand-held) or into a stationary radio telephone (fixed, wireless telephone). Using its card reader CI, emergency call radio device ER1 reads the emergency data from memory card CC, which has been inserted by the user. This memory card CC is, for example, the so-called patient chip card of the user or that of another person requiring assistance.

In an emergency situation, the emergency data, which include personal and medical data, are transmitted multiple times in an emergency call message EMES on a mobile radio channel. On the receiving side, the received emergency call message signals radio switching center MSC, which is equipped in this case with one of the emergency call receiver devices R. Inside this emergency call receiver device, emergency call message EMES is evaluated by decoding and deciphering stages in order to trigger the alarm functions required for the reported emergency.

In this example, an emergency call that indicates a motor vehicle accident is transmitted. The transmission of the emergency call can be triggered by an acceleration meter (crash sensor) in the vehicle. The approximate position of the point of accident is determined by the radio link hop range, that is, by the identification of the corresponding stationary radio base stations. Emergency call receiver device R triggers a visual alarm L in service and evaluation center OMC, and transmits emergency data EDAT to alarm center EC by way of the telephone network connected to radio switching center MSC. This alarm center can initiate efficient action with the aid of the emergency data. Furthermore, service and evaluation center OMC can initiate the transmission of a brief message (short message broadcast) with warning indications to all mobile radio subscribers located in the vicinity of the scene of the accident.

In the emergency call system ESYS shown, the telephone network TN is used to transmit emergency call messages EMES. This telephone network is, for example, a public, ISDN-capable telephone network equipped with emergency call transmission devices EW, which transmit emergency call messages on the data channel (D channel) according to ISDN protocols.

By way of example, two emergency call transmission devices EW are shown here, of which one is integrated into a table telephone unit, and the other is integrated into the base unit of a cordless telephone CT. In future telecommunication networks designed according to the UPT concept (Universal Personal Telecommunications; see the article "Dritte Generation der Mobilkommunikation" (in English: "The Third Generation of Mobile Communication"), by Dr. of Engineering H. Armbruster, 1992, Telecom Report 15, part 2, Siemens AG, Munich, Germany), card readers will already be built into subscriber terminals, and can then be used to read emergency call data.

An emergency call is initiated by the insertion of the patient chip card. It is also conceivable to initiate the emergency call by operating the selection keyboard, with a plurality of key combinations being available. Each key combination corresponds to a logical switching means that effects the linkage of emergency call message EMES with a predetermined identification. The respective identification determines which alarm function, here for example alarm A, will be triggered by one of the emergency call receiver devices.

In this embodiment, for the purpose of triggering an acoustical alarm A in the vicinity in an emergency, an emergency call receiver device R is installed in private branch exchange PABX, to which the two telephones are connected. The emergency call is conducted by way of the telephone network to the closest local switching center, to which an alarm center EC is connected. The alarm center, which is, for example, the local rescue relay center, receives emergency call data EDAT in order to request specific emergency services (doctor on emergency call, fire department) and to provide them with detailed information.

Emergency call system ESYS permits everyone to obtain assistance quickly and efficiently. Through the use of the public telephone network, the emergency call system ESYS may be realized cost-effectively and over large areas.

The emergency call system ESYS shown in FIG. 1 further comprises an energy-supply network PN, here for example a streetlight network PN, by way of which emergency call messages are transmitted by means of pulse-code modulation. Wire-bound emergency call transmission devices EW are connected to streetlight network PN, which is connected to telephone network TN by way of an NF transmitter. These devices are, for example, conspicuously-marked emergency telephones installed at locations that represent particularly dangerous areas (train stations, airports, parking garages, street crossings, etc.). An emergency call using an emergency call message is placed when a memory card CC is inserted into one of the emergency telephones. In addition to emergency data EDAT, the emergency call message includes the location identification of the emergency telephone EW used. The emergency call is conducted to telephone network TN with the aid of the NF transmitter to be transmitted to the alarm center.

Streetlight network PN includes emergency call receiver devices R, which are installed at selected locations in order to trigger predetermined alarm functions there. In this example, one of the emergency call receiver devices R, to which a video camera V is connected, is installed in the immediate vicinity of a building (bank, embassy) to be observed. When an emergency call is initiated by one of the nearest emergency call receiver devices, this emergency call receiver device activates video camera V. This camera in turn transmits image data to the alarm center at a transmission speed of, for example, 64 Kbit. There, continuous images of the image data are reproduced for display on the monitor.

The emergency call system ESYS shown in FIG. 1 is an embodiment that indicates the multi-faceted application of the invention. Numerous configurations that have been optimized for specific requirements (transport monitoring, protection of objects, works protection) are conceivable. Embodiments of the wireless emergency call transmission device are also described, and possible realizations of the transmission of the emergency call message are outlined. For example, the following descriptive section also applies for the above-mentioned, wire-bound emergency call transmission devices.

The wireless emergency call transmission device ER1 shown in FIGS. 2a and 2b, hereinafter referred to emergency call radio device, is configured as a portable device to be used in a TDMA (Time Division Multiple Access) mobile radio network.

Figure 2A:
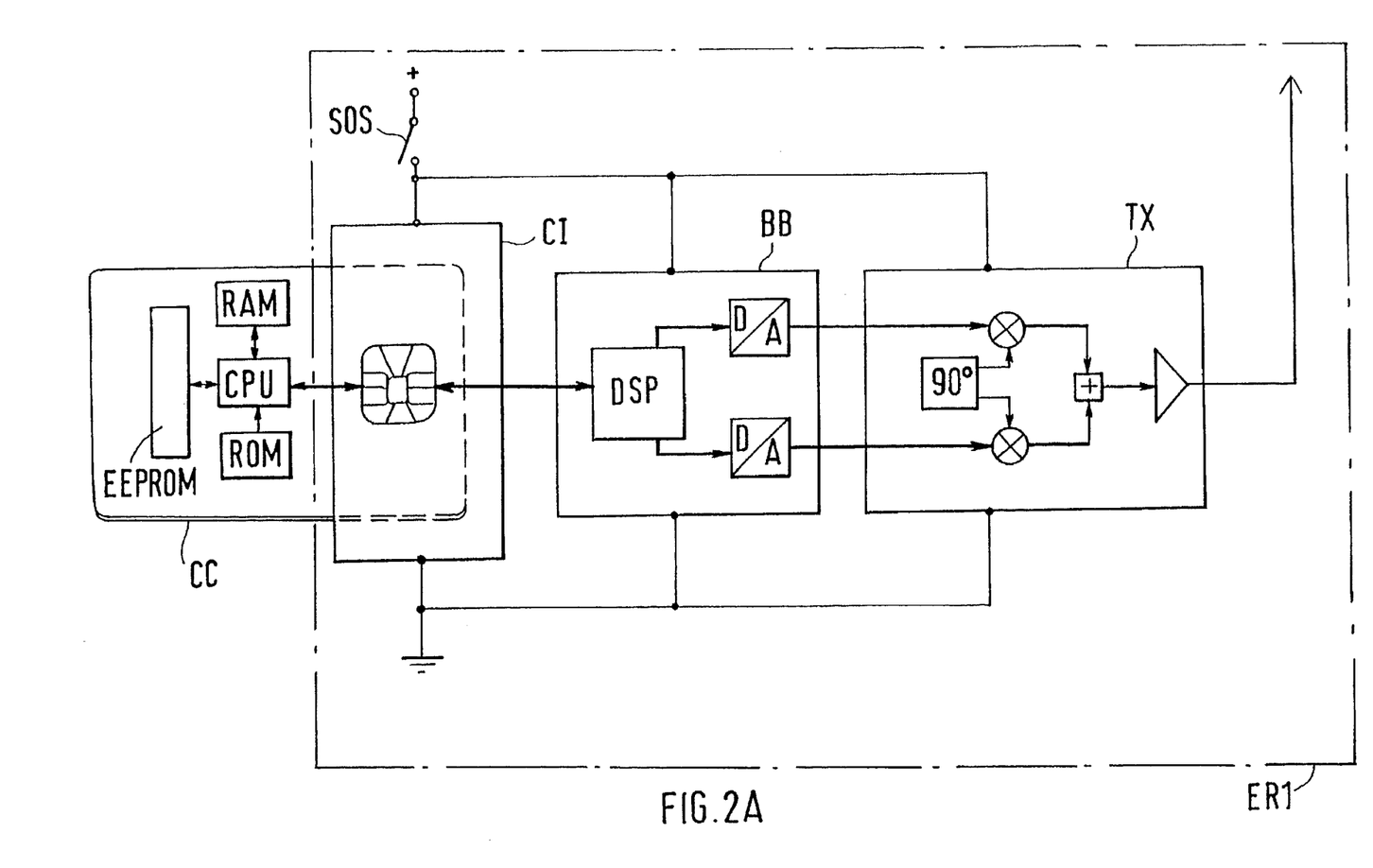
FIG. 2a is a block diagram of a wireless emergency call transmission device that has a chip card reader.

In FIG. 2a, emergency call radio device ER1 comprises a card reader CI, a signal-processing element BB disposed downstream thereof, an HF transmission element TX disposed downstream of signal-processing element BB, and an alarm switch SOS for closing a current supply circuit.

Card reader CI accepts and reads a chip card CC, which contains a central processing unit CPU, a storage unit ROM for constant values, a working memory RAM and a data memory EEPROM. The design and function of such a chip card is described in, for example, the article "Rechengenie in der Plastikkarte" (in English: "Computing Genius in the Plastic Card"), by Dr. T. Wille, published in the magazine "Funkschau" (in English: "Radio Show"), 7th Ed., 1993, Franzis Publishing Co., Munich, and the article by H. P. Kistner, "Funkschau," 6th Ed., 1993, Franzis Publishing Co., Munich.

In this example the card reader CI is configured corresponding to the standard published in the ISO (International Standards Organization) document #7816-2; 1988 (E), Technical Committee ISO/TC 97, Information Processing Systems, May 15, 1988, 1st Ed. Because of this configuration, so-called patient chip cards can be read as described in the above article by H. P. Kistner. These patient chip cards contain personal and medical data pertaining to the cardholder.

The emergency radio device therefore has access to data such as the name, address and insurance number, the blood type and age of the cardholder. In an emergency, these data are available as so-called emergency data that can be transmitted in an emergency call message.

Signal-processing element BB, which comprises a digital signal processor DSP and two digital-analog converters, serves to prepare the emergency call message and produce an analog baseband signal. Signal-processing element BB is connected to card reader CI by way of a PCM bus and, using the read emergency data, generates the quadrature components of a burst-modulated baseband signal.

In the HF transmission element TX, this baseband signal is converted into the HF position, amplified and emitted via an antenna.

The current supply of the above components is closed by way of alarm switch SOS. If the user of emergency call radio device ER1 has inserted his chip card CC into card reader CI, a radio emergency call containing important emergency data can be transmitted at any time by operating alarm switch SOS. Because the illustrated emergency call radio device comprises components known to a person skilled in the art, a detailed description is not provided here. The emergency call radio device ER1 shown in FIGS. 2a and 2b is suited for use in a TDMA mobile radio system, particularly the GSM. Signal-processing element BB, HF transmission element TX and the device control, not shown, correspond to the components of a GSM mobile station, as described in, for example, the article "Architektur eines Mobilfunkgerätes für das Netz D" (in English: "Architecture of a Mobile Radio device for Network D"), by P. Schöffel et al in the magazine "Philips Innovation 1/91."

Figure 2B:
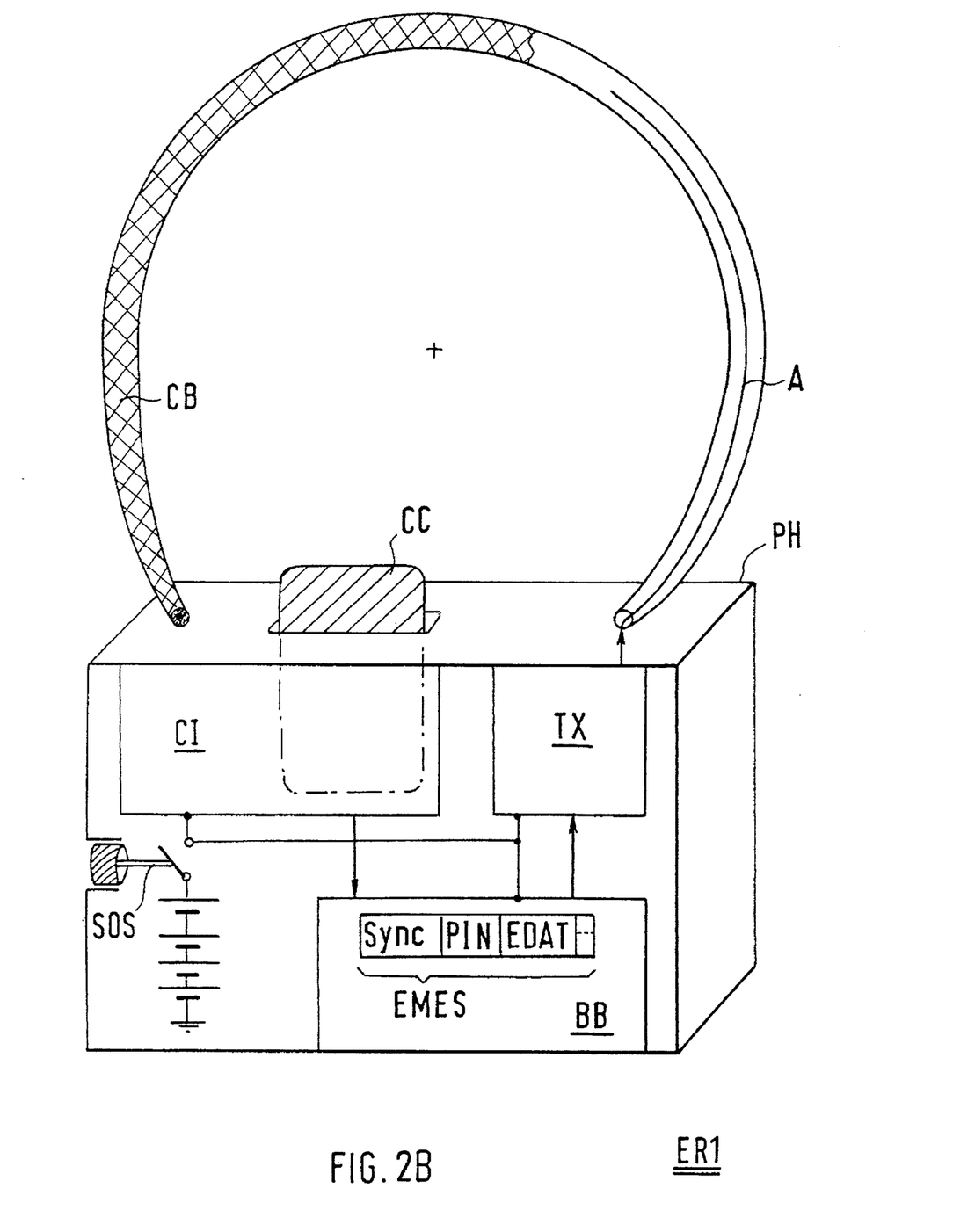
FIG. 2b schematically shows the integration of this emergency call transmission device into a portable housing.

FIG. 2b shows an embodiment of emergency call radio device ER1 that is particularly practical to carry. In this embodiment the above-named components are installed in a portable housing PH. The portable housing is provided with a carrying frame CB, into which an antenna A is integrated. Emergency call radio device ER1 can thus be carried close to the user's body without antenna A representing a spatial obstacle or posing a threat of injury. Moreover, the operating button of alarm switch SOS is imbedded in a housing depression in order to prevent false alarms.

The illustrated emergency call radio device ER1 includes those components required for reading emergency call data EDAT and for transmitting an emergency call message EMES. Further components that are not required for radio transmission of emergency call message EMES, for instance an audio element and an HF receiver element, were omitted. This enables emergency call radio device ER1 to be configured as a very compact, portable instrument. Moreover, within the mobile radio network, no continuous determination of the location (location update) is required, as in a two-way radio device. When personal patient chip card CC is inserted, the instrument is on alarm stand-by. In this state, no supply current flows, so the supply battery remains unloaded. In an emergency, an identification number PIN is first read by means of operating alarm switch SOS; this PIN serves to identify and verify the authenticity of the person in the emergency situation. The reading of the personal emergency data EDAT, such as name, insurance number, blood type, age and indications of high-risk (hemophiliac? Epilepsy? Diabetes?) commences. Access to chip card CC is gained, for example, according to the standard described in ISO document #7816-3: 1988 (E).

The emergency data which have been read are inserted into emergency call message EMES. This emergency call message is created in the manner of, for example, a TDMA access time slot (access burst) according to the GSM standard. It includes a 41-bit sequence Sync for receiver-side synchronization, and a 36-bit sequence for transmitting information data which indicate that an emergency call is being transmitted, and encompass emergency data EDAT. Emergency call message EMES is transmitted multiple times, e.g., 20 times, by way of an organizational channel.

Through the non-verbal transmission of information, a rescue relay center then obtains important emergency data in case no one at the point of the accident is able to speak. The determination of the location of the emergency call radio device ER1 is effected, for example, by measuring the receiving field intensity in the stationary radio stations of the mobile radio network, that is, by means of radio cell allocation. Cross-bearing by means of direction-finders is also conceivable.

The above-described example relates to an emergency call radio device for people located in the supply region of a GSM network. It is also conceivable to use the emergency call radio device for protection of objects, for instance warehouse monitoring, vehicle theft insurance and transportation monitoring. Chip cards used for these purposes would provide detailed identification of the stored goods, the vehicle, or transported item, respectively. It is also conceivable to configure the emergency call radio device to include a card reader or reading device for magnetic strips or punched cards, or to accommodate plug-in chips.

The use of the emergency call radio device is not limited to mobile radio networks. The invention can be configured for arbitrary radio systems in which data can be transmitted. For example, an embodiment for use in a service radio system is conceivable. In this instance, personnel in particular danger would use portable emergency call radio devices, for example integrated into tool bags. The chip card contains, among others, data that provide information on hazardous substances present in the workplace.

The emergency call radio device of the invention can furthermore be integrated into a radio device, particularly into a mobile radio device that already has a card reader. A conventional radio device can thus be expanded to a radio device that has an intelligent emergency call function. In accordance with the invention, for example a GSM mobile radio device is equipped with an intelligent emergency call function in that the program for controlling the instrument (firmware) initiates the reading of emergency data from the patient chip card in the card reader, the creation of the emergency call message in the signal-processing element, and transmission by way of a mobile radio channel. This mobile radio channel is, for example, a signal channel for short message transmission (service).

Figure 3:
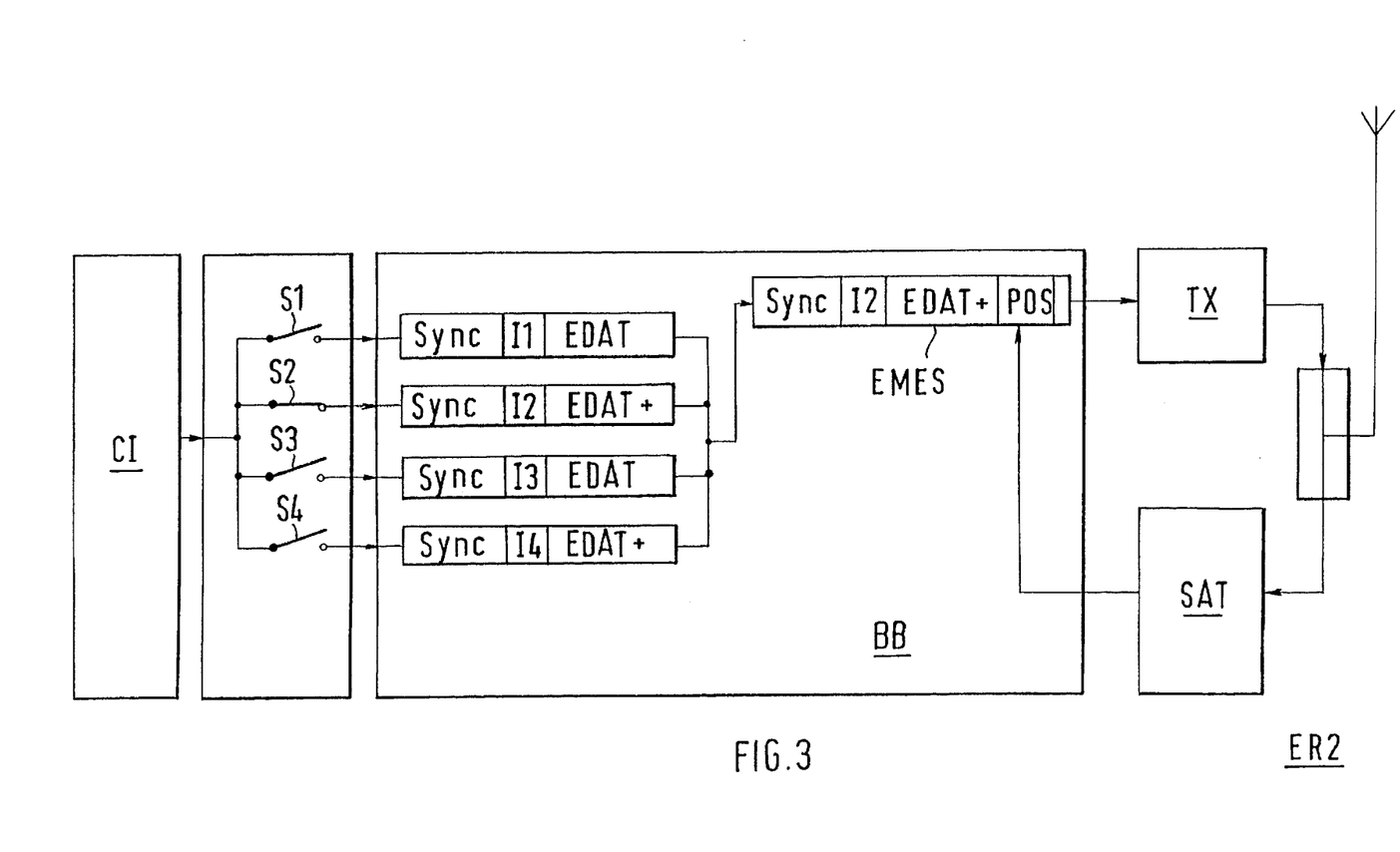
FIG. 3 is a block diagram of a wireless emergency call transmission device for transmitting an emergency call message that gives the alarm category and the location.

A second embodiment according to FIG. 3 is described below.

FIG. 3 illustrates an emergency call radio device ER2 comprising a card reader CI, a downstream selection stage having four switches S1 through S4, a downstream signal-processing element BB, a downstream HF transmission element TX, a downstream duplexer that has a transmitter/receiver antenna and a satellite radio receiver SAT connected on the receiver side and whose data output is connected to signal-processing element BB.

In comparison to the above-described embodiment according to FIG. 2, the second embodiment according to FIG. 3 includes the selection stage and the satellite radio receiver, by means of which a predetermined identification 11 ... 14, or determined position data POS are added to the emergency call message EMES to be transmitted.

The selection stage comprises four switches S1 ... S4 that are respectively assigned a specific alarm category.

Possible alarm categories include:

1.) "Full alarm without ambulance"
2.) "Full alarm with ambulance"
3.) "Silent alarm without ambulance"
4.) "Silent alarm with ambulance"

"Full alarm" means that the alerted emergency crews (police, fire department, etc.) use acoustical and visual warning signals (sirens or blue light) when arriving at the scene of the emergency. In a "silent alarm," these warning signals are not to be used at the scene of the emergency. This is advantageous when, for example, the emergency has been caused by persons using violence who should not be warned (robbery, rape, kidnaping, etc.). Triggering a "silent alarm" can also be practical within the realm of object protection (intrusion, bank robbery). The triggering of one of the two above alarms can be used in conjunction with alerting the medical rescue service.

Switches S1 ... S4 are connected to signal-processing element BB in such a manner that the operation of one of the switches effects the creation of emergency call message EMES corresponding to the selected alarm category. In this example of FIG. 3, the second alarm category "full alarm with ambulance" is selected by operating the second switch S2. First the emergency call message acquires synchronization data Sync, an identification I2 that identifies the selected alarm category, and emergency data EDAT+ with the medical data required for this alarm category. In an alarm without ambulance, only personal data EDAT– are used. Subsequently the emergency call message EMES to be sent acquires geographical position data POS, which are supplied by satellite radio receiver SAT and indicate the momentary location of emergency call radio device ER2. Afterward, emergency call message EMES is transmitted on a radio channel, e.g. on a bundled radio channel, by means of HF transmitter element TX.

Depending on the alarm category selected, emergency call message EMES is created with a specific identification and specific emergency data. On the one hand, this means that the safety and rescue services that are actually required are alerted, and on the other hand, only those required emergency data are transmitted to the rescue relay center that can be evaluated to a good end there.

As an alternative to the embodiment shown in FIG. 3, an emergency call transmission device is conceivable that utilizes a card reader into which the switches are installed so as to scan the contour of the memory card. Hence, the alarm category is determined by the inserted position of a memory card configured, for example, having four different card contours.

The described emergency call radio devices ER1 and ER2 are provided for mobile application of the invention within a radio network, particularly a cellular mobile radio network, and for this purpose can be configured as an individual unit or add-on module for a radio device, respectively. Embodiments are conceivable which permit intermittent stationary use, for instance as portable emergency call boxes for highway construction sites.

Embodiments of the wire-bound emergency call transmission devices EW can be derived from the above description of wireless emergency call transmission devices ER1 and ER2, because the two emergency call transmission devices are identical in operating principle. They differ only in their physical connection (wireless or wire-bound) to the transmission network of the emergency call system.

For example, wire-bound emergency call transmission device EW includes a modulation stage that is integrated into signal-processing element BB and, in accordance with the DTMF (Dual Tone Multi-frequency) transmission method, feeds emergency call message EMES into an analogous telephone network for transmission.

The described embodiments of the emergency call system are particularly advantageous for personal protection.

Numerous other embodiments are conceivable, including those optimized for the protection of goods.

It will be understood that the above description of the preferred embodiment of the present invention is susceptible to various modifications, changes, and adaptations, and the same are intended to be comprehended within the meaning and range of equivalents of the appended claims.

What is claimed is:

1. An emergency call system comprising:
   a wireless telecommunication network having predetermined radio channels;
   at least one wireless emergency call transmission means for reading emergency data and transmitting the data in an emergency call message on at least one of the radio channels; and
   at least one emergency call receiver means for receiving and evaluating the emergency call message, and at least one of:
   triggering at least one alarm function, and
   further conducting the emergency data to an alarm center connected to the wireless telecommunication network;
   wherein the at least one wireless emergency call transmission means comprises:
   a card reader for reading the emergency data from a memory card.

2. The emergency call system as defined in claim 1, wherein the at least one wireless emergency call transmission means further comprises:
   a signal-processing element disposed downstream of the card reader, for preparing an emergency call message using the emergency data; and
   an HF transmission element disposed downstream of the signal-processing element for transmitting the emergency call message on a predetermined channel.

3. The emergency call system as defined in claim 2, wherein the at least one wireless emergency call transmission means signal-processing element creates the emergency call message according to a signal format which is predetermined in a service or mobile radio system.

4. The emergency call system as defined in claim 3, wherein the signal format is a TDMA format.

5. The emergency call system as defined in claim 2, wherein the at least one wireless emergency call transmission means signal-processing element is connected to a satellite radio receiver in order to determine position, which satellite receiver determines actual position data, and wherein the signal-processing element links the emergency call message with these position data.

6. The emergency call system as defined in claim 2, wherein the memory card is a patient chip card on which medical data of a patient is stored, and wherein the card reader reads the medical data as emergency data to create the emergency call message.

7. The emergency call system as defined in claim 2, wherein the at least one emergency call transmission means comprises switching means, connected to the signal-processing element, for linking the emergency call message with an identification corresponding to a given alarm category and for determining the alarm functions to be triggered.

8. The emergency call system as defined in claim 7, wherein the memory card is configured so that it assumes at least two different inserted positions in the card reader, the at least two different inserted positions each determining an alarm category, wherein the respective inserted position causes at least one of the switching means to be switched.

9. The emergency call system as defined in claim 2, wherein the at least one emergency call transmission means comprises a wireless device having a portable housing which includes a carrying frame and an antenna integrated therein.

10. The emergency call system as defined in claim 1, wherein the wireless telecommunication network having predetermined radio channels comprises one of:

a service, and a mobile radio network.

11. The emergency call system as defined in claim 1, wherein the memory card is a patient chip card on which medical data of a patient is stored, and wherein the card reader reads the medical data as emergency data to create the emergency call message.

12. An emergency call system comprising:

a wire-bound transmission network having at least one available message channel;

at least one wire-bound emergency call transmission means for reading emergency data and an identification number of the emergency data and transmitting the data and identification number together in an emergency call message on the message channel; and at least one emergency call receiver means for receiving and evaluating the emergency call message, and at least one of:

triggering at least one alarm function, and further conducting the emergency data to an alarm center connected to the wireless telecommunication network;

wherein the at least one wire-bound emergency call transmission means comprises:

a card reader for reading the emergency data and identification number of a person calling from a memory card.

13. The emergency call system as defined in claim 12, wherein the wire-bound transmission network is at least one of:

a telecommunication network, and an electrical energy-supply network having predetermined message channels.

14. The emergency call system as defined in claim 12, wherein the at least one wire-bound emergency call transmission means further comprises:

a signal-processing element, disposed downstream of the card reader for creating an emergency call message using the emergency data and the identification number, and transmitting the emergency call message on a predetermined message channel.

15. The emergency call system as defined in claim 14, wherein the memory card is a patient chip card on which medical data of a patient is stored, and wherein the card reader reads the medical data as the emergency data to create the emergency call message.

16. The emergency call system as defined in claim 14, wherein the at least one wire-bound emergency call transmission means comprises switching means connected to the signal-processing element, for linking the emergency call message with an identification corresponding to a given alarm category and for determining the alarm functions to be triggered.

17. The emergency call system as defined in claim 16, wherein the memory card is configured so that it assumes at least two different inserted positions in the card reader, the at least two different inserted positions each determining an alarm category, wherein the respective inserted position causes at least one of the switching means to be switched.

18. The emergency call system as defined in claim 12, wherein the memory card is a patient chip card on which medical data of a patient is stored, and wherein the card reader reads the medical data as the emergency data to create the emergency call message.

* * * * *